United States Patent
Burcham et al.

(10) Patent No.: US 9,363,391 B2
(45) Date of Patent: *Jun. 7, 2016

(54) WIRELESS DEVICE ACCESS TO COMMUNICATION SERVICES THROUGH ANOTHER WIRELESS DEVICE

(71) Applicant: Sprint Communications Company L.P., Overland Park, KS (US)

(72) Inventors: Robert H. Burcham, Overland Park, KS (US); Brandon Christopher Annan, Westwood Hills, KS (US); Jason R. Delker, Olathe, KS (US); Cesar Perez, Olathe, KS (US); Thomas W. Keel, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 360 days.

This patent is subject to a terminal disclaimer.

(21) Appl. No.: 14/108,736

(22) Filed: Dec. 17, 2013

(65) Prior Publication Data
US 2014/0106705 A1    Apr. 17, 2014

Related U.S. Application Data

(63) Continuation of application No. 13/070,607, filed on Mar. 24, 2011, now Pat. No. 8,644,255.

(51) Int. Cl.
*H04W 4/00* (2009.01)
*H04M 17/00* (2006.01)
*H04W 88/06* (2009.01)
*H04W 4/24* (2009.01)
*H04W 4/18* (2009.01)
*H04M 15/00* (2006.01)

(52) U.S. Cl.
CPC .............. *H04M 17/10* (2013.01); *H04W 88/06* (2013.01); *H04M 15/854* (2013.01); *H04W 4/18* (2013.01); *H04W 4/24* (2013.01)

(58) Field of Classification Search
None
See application file for complete search history.

(56) References Cited

U.S. PATENT DOCUMENTS

| | | |
|---|---|---|
| 5,329,635 A | 7/1994 | Wadin et al. |
| 5,436,956 A | 7/1995 | Shiotsuki et al. |
| 5,450,473 A | 9/1995 | Shiotsuki et al. |
| 5,548,808 A | 8/1996 | Bruckert et al. |
| 6,487,409 B2 | 11/2002 | Qing-An |
| 6,507,740 B2 | 1/2003 | Shi |
| 6,714,789 B1 | 3/2004 | Oh et al. |
| 6,745,034 B2 | 6/2004 | Wang et al. |
| 6,907,243 B1 | 6/2005 | Patel |
| 7,076,245 B1 | 7/2006 | Satapathy |

(Continued)

*Primary Examiner* — Kwang B Yao
*Assistant Examiner* — Hardikkumar Patel (57) ABSTRACT

A wireless communication device operates between a WiFi link and an LTE link. The device receives a request indicating a user identifier and determines if the user identifier has sufficient usage credit. If there is sufficient usage credit, the device exchanges WiFi signals and LTE signals including user communications. The device decrements the usage credit and transfers usage credit consumption over the LTE link. After decrementing the usage credit, the device determines if the user identifier has sufficient usage credit, and if the user identifier does not, the device transfers a credit request and receives an additional usage credit for the user identifier over the LTE link. The device exchanges additional WiFI signals and LTE signals including additional user communications. The device decrements the additional usage credit and transfers additional usage credit consumption over the LTE link.

20 Claims, 6 Drawing Sheets

(56) References Cited

U.S. PATENT DOCUMENTS

| | | |
|---|---|---|
| 7,089,007 B2 | 8/2006 | Wakuta et al. |
| 7,092,722 B1 | 8/2006 | Oh et al. |
| 7,206,579 B2 | 4/2007 | Gwon et al. |
| 7,693,518 B2 | 4/2010 | Miyata |
| 7,720,098 B1 | 5/2010 | Allen et al. |
| 8,457,038 B1 | 6/2013 | Xue et al. |
| 2002/0102977 A1 | 8/2002 | Shi |
| 2003/0119508 A1 | 6/2003 | Gwon et al. |
| 2004/0037306 A1* | 2/2004 | Khan ................ H04L 12/5695 370/437 |
| 2004/0063494 A1* | 4/2004 | Oram ..................... A63F 13/12 463/42 |
| 2005/0221828 A1 | 10/2005 | Wakuta et al. |
| 2006/0109820 A1 | 5/2006 | Miyata |
| 2008/0070576 A1 | 3/2008 | Sanders et al. |
| 2010/0056157 A1 | 3/2010 | Verona et al. |
| 2010/0313082 A1* | 12/2010 | Kim .................... H04L 12/6418 714/57 |
| 2012/0155296 A1* | 6/2012 | Kashanian .......... H04L 12/1417 370/252 |
| 2012/0263148 A1* | 10/2012 | Bachmann ............ H04W 28/16 370/331 |

\* cited by examiner

WIRELESS DEVICE ACCESS TO COMMUNICATION SERVICES THROUGH ANOTHER WIRELESS DEVICE

RELATED CASES

This patent application is a continuation application of and claims priority to U.S. Pat. No. 8,644,255 that issued on Feb. 4, 2014 and was filed on Mar. 24, 2011 and is entitled, "WIRELESS DEVICE ACCESS TO COMMUNICATION SERVICES THROUGH ANOTHER WIRELESS DEVICE." U.S. Pat. No. 8,644,255 is hereby incorporated by reference into this application.

TECHNICAL FIELD

Aspects of the disclosure are related to the field of communications, and in particular, providing wireless access for wireless devices to wireless communication services over wireless communication networks through other wireless devices.

TECHNICAL BACKGROUND

Wireless communication devices, such as mobile phones, provide access to wireless communication services for a user of the wireless communication device. The wireless communication services are accessed over a wireless communication network, such as a cellular voice and data network. The wireless communication devices typically communicate with a base station or other wireless access node to receive wireless access to the communication services.

In many wireless communication devices, additional local-area networking features are included, such as wireless local-area network (LAN) features, including wireless fidelity (Wi-Fi) type networking features, Bluetooth, or other local-area networking features. These local-area networking features can provide wireless access to some of the communication services that are available to the wireless communication device for nearby devices and users. Some examples of wireless communication devices which include local-area networking features are personal hotspots and MiFi devices.

OVERVIEW

A wireless communication device operates between a WiFi link and an LTE link. The device receives a request indicating a user identifier and determines if the user identifier has sufficient usage credit. If there is sufficient usage credit, the device exchanges WiFi signals and LTE signals including user communications. The device decrements the usage credit and transfers usage credit consumption over the LTE link. After decrementing the usage credit, the device determines if the user identifier has sufficient usage credit, and if the user identifier does not, the device transfers a credit request and receives an additional usage credit for the user identifier over the LTE link. The device exchanges additional WiFI signals and LTE signals including additional user communications. The device decrements the additional usage credit and transfers additional usage credit consumption over the LTE link.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
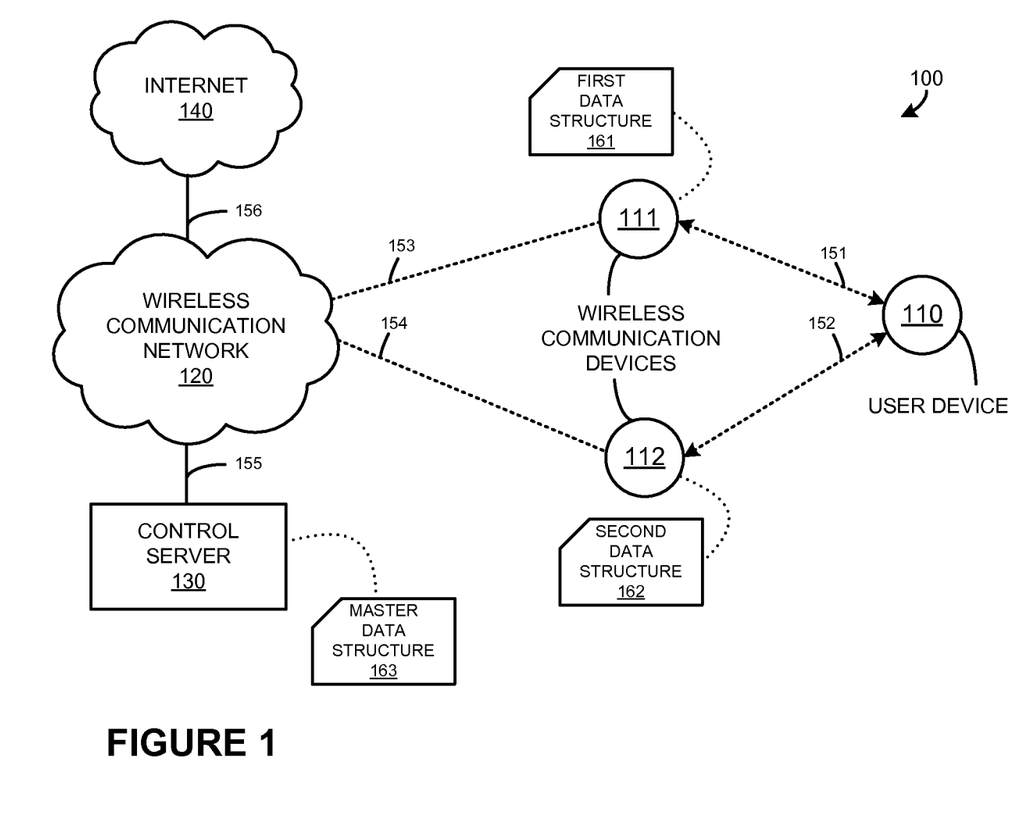
FIG. 1 is a system diagram illustrating a communication system.

FIG. 1 is a system diagram illustrating communication system 100. Communication system 100 includes user device 110, wireless communication devices 111-112, wireless communication network 120, control server 130, and Internet 140. User device 110 and wireless communication device 111 can communicate over wireless link 151. User device 110 and wireless communication device 112 can communicate over wireless link 152. Wireless communication device 111 and wireless communication network 120 communicate over wireless link 153. Wireless communication device 112 and wireless communication network 120 communicate over wireless link 154. Wireless communication network 120 and control server 130 communicate over link 155. Wireless communication network 120 and Internet 140 communicate over link 156.

In FIG. 1, wireless communication device 111 and wireless communication device 112 can each receive wireless access to communication services through wireless communication network 120. Also, in FIG. 1, user device 110 comprises a wireless communication device. User device 110 desires to receive wireless access to communication services through wireless communication network 120, such as receiving access to Internet 140, but user device 110 does not have wireless access to wireless communication network 120. Wireless communication devices 111-112 and control server 130 each include data structures, as indicated by data structures 161-163 in FIG. 1.

Figure 2:
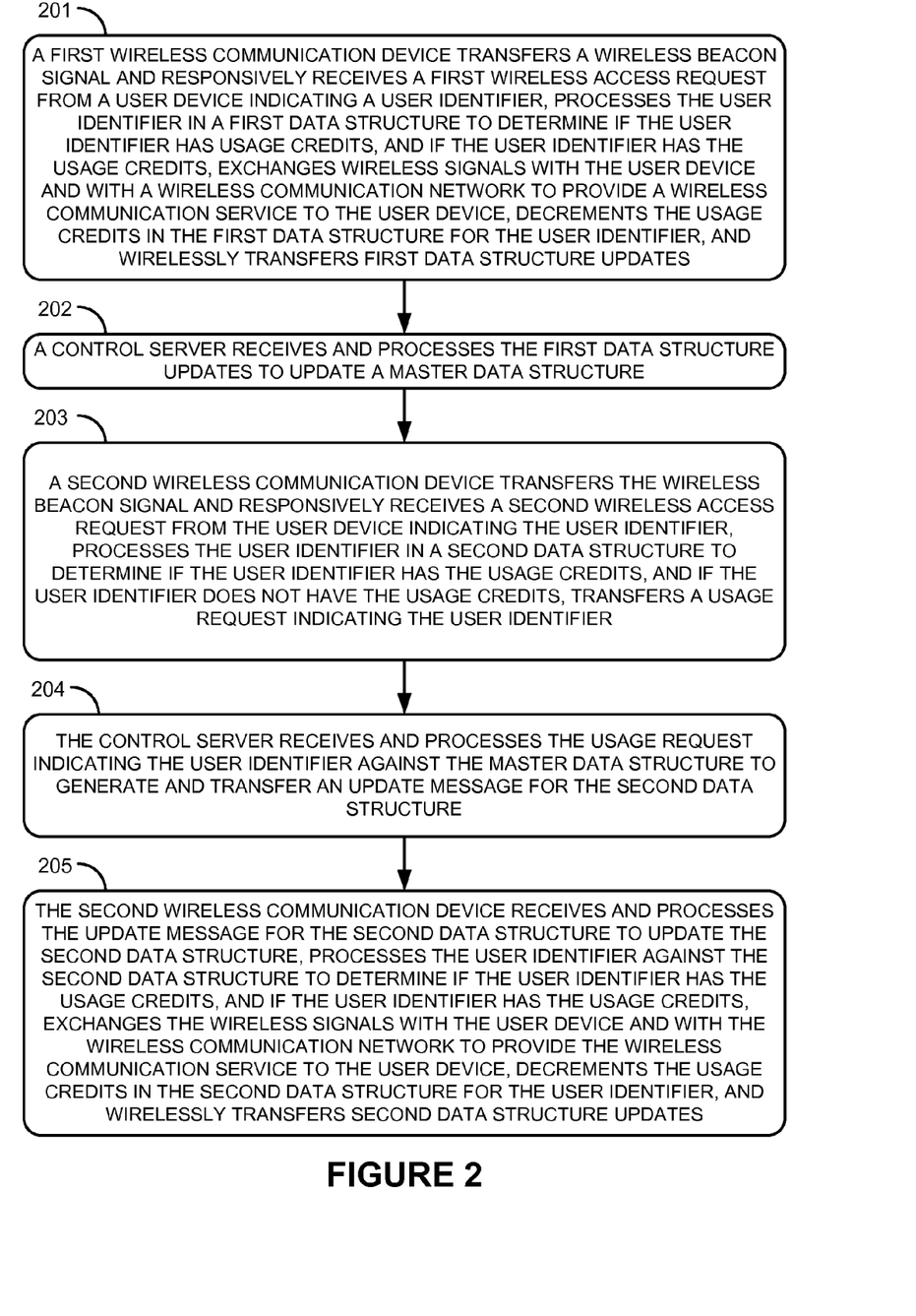
FIG. 2 is a flow diagram illustrating a method of operation of a communication system.

FIG. 2 is a flow diagram illustrating a method of operation of communication system 100. The operations of FIG. 2 are referenced herein parenthetically. In FIG. 2, wireless communication device 111 transfers (201) a wireless beacon signal and responsively receives a first wireless access request from a user device 110 indicating a user identifier, processes the user identifier in first data structure 161 to determine if the user identifier has usage credits, exchanges wireless signals with user device 110 and with wireless communication network 120 to provide a wireless communication service to user device 110, decrements the usage credits in first data structure 161 for the user identifier, and wirelessly transfers first data structure updates. The wireless beacon signal indicates to user device 110 that wireless communication device 111 is able to provide wireless access to communication services for user device 110. In some examples, the wireless beacon signal comprises a wireless LAN broadcast signal, which could include a service set identifier (SSID). The first wireless access request includes a request from user device 110 requesting wireless access to the communication services provided by wireless communication device 111, such as a request to access a wireless LAN of wireless communication device 111, or to access Internet 140 through wireless communication device 111. Additionally, the first wireless access request indicates a user identifier. The user identifier in this example is an identifier for user device 110, and could include a media access control (MAC) address, network identifier, mobile device number (MDN), mobile station identifier (MSID), mobile equipment identifier (MEID), mobile identification number (MIN), electronic serial number (ESN), SIM card identifier, phone number, account number, or other identifier.

First data structure 161 includes a listing of user identifiers correlated to usage credits for the user identifiers. First data structure 161 could comprise a table, spreadsheet, database, or other data structure correlating user identifiers with usage credits. The usage credits indicate incremental time-based usage amounts for user device 110 to access the communication services provided through wireless communication device 111, such as to access Internet 140. The usage credits could indicate a quantity of time left for access, such as minutes, an amount of remaining access time previously purchased by user device 110, or an amount of connection instances for accessing a wireless link provided by wireless communication device 111, among other representations. If user device 110 has sufficient usage credits indicated in first data structure 161, then wireless communication device 111 provides access to the communication services for user device 110. The access is provided by exchanging wireless signals with user device 110, which could include a wireless link, wireless local-area network (LAN), Bluetooth link, or other wireless signals. Wireless communication device 111 also exchanges wireless signals with wireless communication network 120 to provide the communication service to user device 110, such as communicating over a wireless link, cellular data link, or other wireless signals. As the wireless signals are exchanged and the communication service is provided to user device 110, the usage credits for user device 110 are decremented in first data structure 161. The decrementing could occur periodically during the communication services provided by wireless communication device 111. For example, when the usage credits comprise minutes remaining for access to the communication services for user device 110, then wireless communication device 111 could decrement the remaining minutes in first data structure 161 after each minute of communication service usage by user device 110.

Control server 130 receives (202) and processes the first data structure updates to update master data structure 163. In this example, control server 130 receives the first data structure updates over link 155, and updates master data structure 163 based on the first data structure updates. The first data structure updates could include updated usage credit amounts determined by wireless communication device 111 based on the communication service usage by user device 110. In some examples, the first data structure updates include information on the decrementing of the usage credits performed by wireless communication device 111. In other examples, the first data structure updates comprises first data structure 161, or a portion thereof. Updating master data structure 163 includes incorporating the information from the first data structure updates into master data structure 163, such as merging data for the user identifier associated with user device 110, among other operations. The first data structure updates could be transferred periodically during the communication services provided by wireless communication device 111, or during commencement or termination of the communication services by wireless communication device 111, among other transfer times.

Wireless communication device 112 transfers (203) the wireless beacon signal and responsively receives a second wireless access request from user device 110 indicating the user identifier, processes the user identifier in second data structure 162 to determine if the user identifier has the usage credits, and if the user identifier does not have the usage credits, transfers a usage request indicating the usage identifier. As with operation 201, the wireless beacon signal transferred by wireless communication device 112 indicates to user device 110 that wireless communication device 112 is able to provide wireless access to communication services for user device 110. The wireless beacon signal transferred by wireless communication device 112 could be similar to that transferred by wireless communication device 111, or include similar identifiers or wireless properties, such as including the same SSID. The second wireless access request includes a request from user device 110 requesting wireless access to the communication services provided by wireless communication device 112, such as a request to access Internet 140 through wireless communication device 112. Additionally, the second wireless access request indicates a user identifier. The user identifier in this example is an identifier for user device 110, and could include a media access control (MAC) address, or other identifier similar to the first wireless access request.

Second data structure 162 includes a listing of user identifiers correlated to usage credits for the user identifiers, and could include a different listing than first data structure 161. As with first data structure 161, second data structure 162 could also comprise a table, spreadsheet, database, or other data structure correlating user identifiers with usage credits. The usage credits indicate incremental time-based usage amounts for user device 110 to access the communication services provided through wireless communication device 112, such as to access Internet 140. The usage credits could indicate a quantity of time left for access, such as minutes, an amount of remaining access time previously purchased by user device 110, or an amount of connection instances, among other representations. If the user identifier does not have the usage credits, then wireless communication device 112 transfers a usage request indicating the usage identifier for delivery to control server 130. A user identifier might not have usage credits if the user identifier is not listed in second data structure 162, if the usage credits do not exceed a minimum amount, or if no usage credits remain for the user identifier in second data structure 162, among other configurations. The usage request could comprise a query for master data structure 163 to determine if user device 110 has any usage credits listed in master data structure 163, or an indication to control server 130 that no usage credits remain in second data structure 162, among other information.

Control server 130 receives (204) and processes the usage request indicating the user identifier against master data structure 163 to generate and transfer an update message for second data structure 162. In some examples, usage credits for user device 110 are listed in master data structure 163 but not in second data structure 162, perhaps due to user device 110 not previously receiving wireless access to communication services through wireless communication device 112 before, or due to user device 110 previously depleting all usage credits listed in second data structure 162. Control server 130 could initiate a usage credit process with user device 110 to increase the amount of usage credits in master data structure 163 or to initialize a listing for usage credits for the user identifier associated with user device 110 in master data structure 163. In examples where the usage credits for user device 110 are listed in master data structure 163, control server 130 generates an update message based on the listing for the user identifier associated with user device 110 in master data structure 163, and transfers the update message for delivery to wireless communication device 112. The update message could include updated usage credit amounts determined by control server 130 based on the information included in master data structure 163 for user device 110. In some examples, the update message includes information for increasing the usage credits within second data structure 162, or for initiating a listing for usage credits for the user identifier associated with user device 110 in second data structure 162. In other examples, the update message comprises master data structure 163, or a portion thereof.

Wireless communication device 112 receives (205) and processes the update message for second data structure 162 to update second data structure 162, processes the user identifier against second data structure 162 to determine if the user identifier has the usage credits, and if the user identifier has the usage credits, exchanges the wireless signals with user device 110 and with wireless communication network 120 to provide the wireless communication service to user device 110, decrements the usage credits in second data structure 162 for the user identifier, and wirelessly transfers second data structure updates. Updating second data structure 162 includes incorporating the information from the update message into second data structure 162, such as merging data for the user identifier associated with user device 110, or creating a new listing for the user identifier associated with user device 110, among other operations. If the user identifier associated with user device 110 now has sufficient usage credits indicated in second data structure 162, then wireless communication device 112 provides access to the communication services for user device 110. The access is provided by exchanging wireless signals with user device 110, which could include a wireless link, wireless local-area network (LAN), Bluetooth link, or other wireless signals. Wireless communication device 112 also exchanges wireless signals with wireless communication network 120 to provide the communication service to user device 110, such as communicating over a wireless link, cellular data link, or other wireless signals.

As the wireless signals are exchanged and the communication service is provided to user device 110, the usage credits for user device 110 are decremented in second data structure 162. The decrementing could occur periodically during the exchange of the wireless signals providing the communication service. For example, when the usage credits comprise minutes remaining for access to the communication services for user device 110, then wireless communication device 112 could decrement the remaining minutes in second data structure 162 after each minute of communication service usage by user device 110. The second data structure updates could include updated usage credit amounts determined by wireless communication device 112 based on the communication service usage by user device 110. In some examples, the second data structure updates include information on the decrementing of the usage credits performed by wireless communication device 112. In other examples, the second data structure updates comprise second data structure 162, or a portion thereof. In further examples, control server 130 receives the second data structure updates, and updates master data structure 163 based on the second data structure updates.

Figure 3:
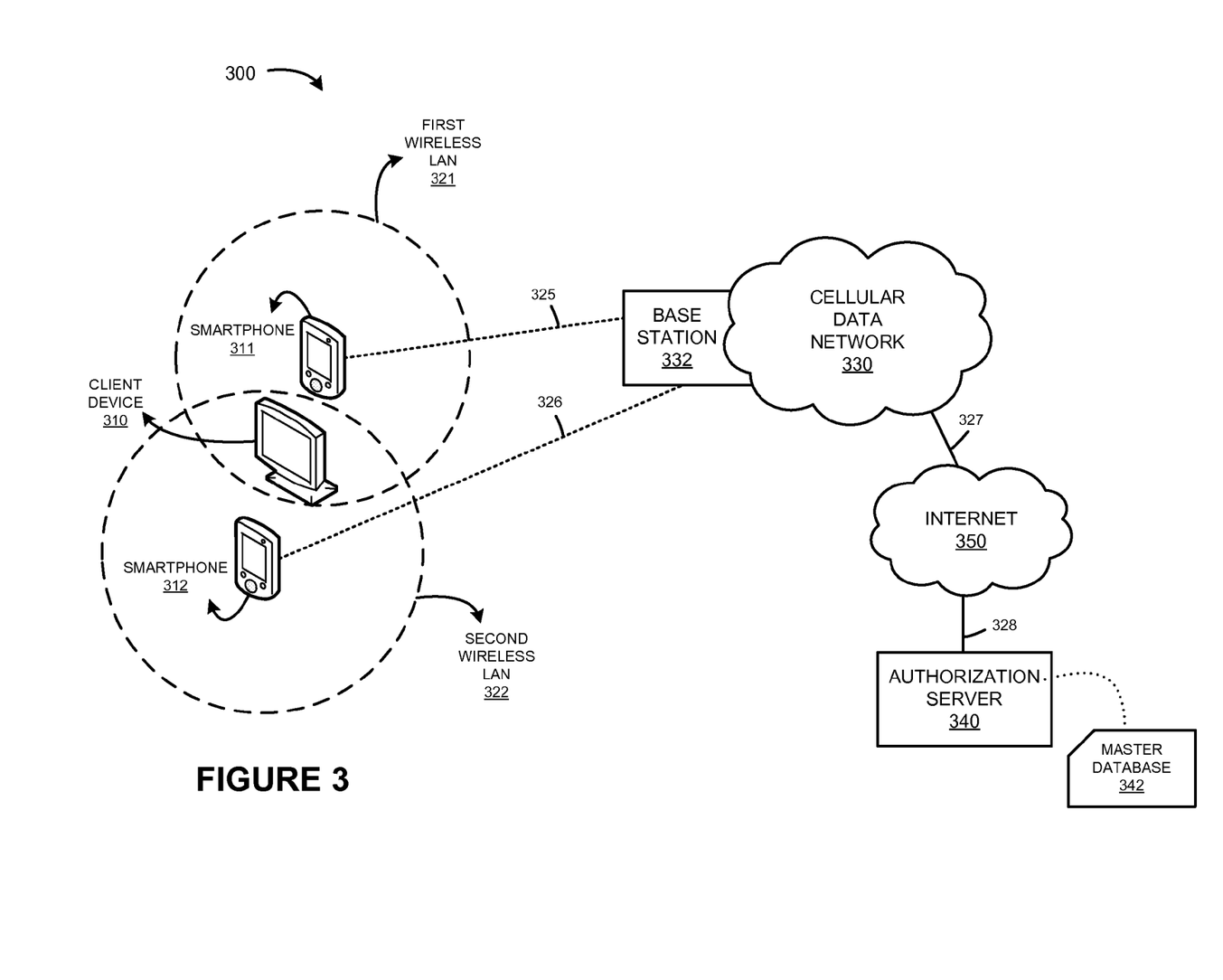
FIG. 3 is a system diagram illustrating a communication system.

FIG. 3 is a system diagram illustrating communication system 300. Communication system 300 includes client device 310, smartphones 311-312, cellular data network 330, base station 332, authorization server 340, and Internet 350. Smartphone 311 and base station 332 communicate over wireless link 325, which is a Worldwide Interoperability for Microwave Access (WiMAX) wireless link in this example. Smartphone 311 and base station 332 communicate over wireless link 326, which is also a WiMAX wireless link in this example. It should be understood that multiple base stations and different wireless communication modes could be used by smartphones 311-312. Cellular data network 330 and Internet 350 communicate over Metropolitan Area Network (MAN) link 327. Authorization server 340 and Internet 350 communicate over T1 link 328.

Client device 310 comprises a laptop computer in this example, and includes wireless local-area network (LAN) interface equipment. Smartphones 311-312 are each mobile smartphone devices in this example. Smartphones 311-312 are each capable of providing a wireless network for other devices, such as for client device 310. In FIG. 3, smartphone 311 provides first wireless LAN 321, and smartphone 312 provides second wireless LAN 322.

Cellular data network 330 comprises a wireless network of a wireless communication provider, such as a cellular phone and data service provider, among other examples. Base station 332 is associated with cellular data network 330 in this example, and provides wireless access to the communication services of cellular data network 330. The communication services include data communication services in this example, but could also include voice calls, text messaging, or other communication services. Base station 332 comprises RF communication and control circuitry, transceiver, and antennas, as well as wireless communications equipment capable of communicating with and providing wireless access to communication services for user devices, such as smartphones 311-312, using the WiMAX communication mode. Cellular data network 330 could comprise further base stations, base transceiver stations (BTS), radio node controllers (RNC), base station controllers (BSC), mobile switching centers (MSC), authentication, authorization and accounting (AAA) equipment, wireless access nodes, wireless access node controllers, routers, transceivers, or antennas, among other equipment and systems.

Authorization server 340 includes computer processing equipment for determining usage credits for user devices, and allowing user devices to purchase usage credits, among other operations. Authorization server 340 includes equipment such as computer processing systems, communication interfaces, computer-readable storage media, and other equipment to store and exchange call records information for wireless communication devices. Authorization server 340 may comprise operating systems, logs, utilities, drivers, networking software, firmware, and other software typically loaded onto a computer system. In some examples, authorization server 340 includes software and equipment to provide a web-based usage credit purchase system, or could include software and equipment to establish tunnels over Internet 350 with user devices, such as client device 310.

Internet 350 includes equipment and systems to route packet communications between endpoints using the Internet protocol (IP). Internet 350 could comprise routers, switches, gateways, or bridges, as well as various interconnecting network links.

Figure 4:
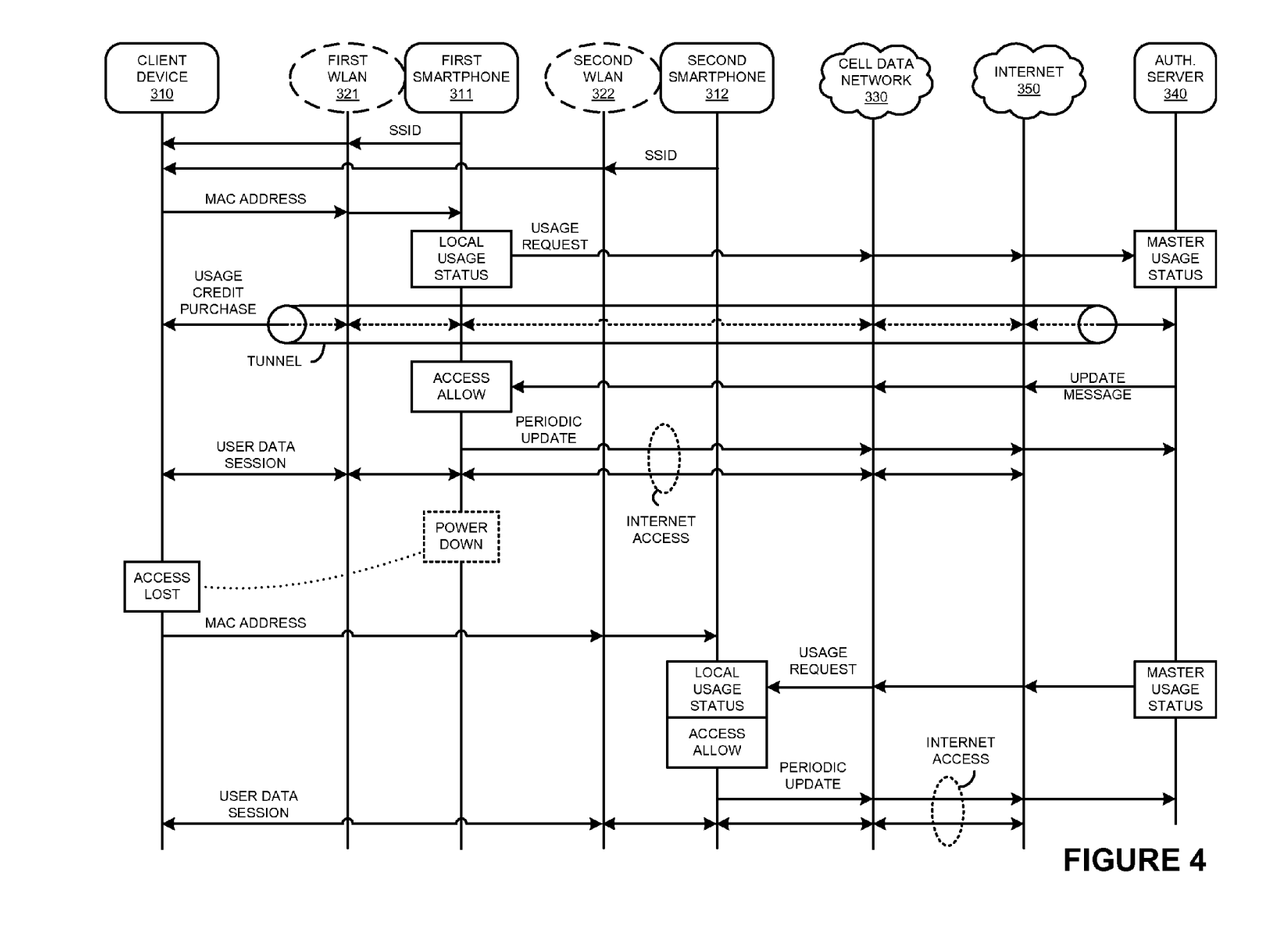
FIG. 4 is a sequence diagram illustrating a method of operation of a communication system.

FIG. 4 is a sequence diagram illustrating a method of operation of communication system 300. In FIG. 4, client device 310 seeks wireless access to Internet 350. First smartphone 311 initially provides first wireless LAN (WLAN) 321, and broadcasts an SSID associated with WLAN 321 in a wireless broadcast message for WLAN 321. Second smartphone 312 also initially provides second wireless LAN (WLAN) 322, and broadcasts an SSID associated with WLAN 322 in a wireless broadcast message for WLAN 322. In this example, WLAN 321 and WLAN 322 each comprise an IEEE 802.11-compatible wireless local-area network, although other wireless networks could be employed, such as Bluetooth, personal area networks (PAN), IEEE 802.16, ZigBee, optical wireless networks, or other wireless networks. As discussed in this example, the SSIDs broadcast over WLAN 321 and WLAN 322 are each the same SSID. The SSID, or other identifiers, could be provided to each of smartphones 311-312 by authorization server 340, or associated with a common service provider of first smartphone 311 and second smartphone 312. In some examples, client device 310 monitors for a predetermined SSID associated with wireless communication service from the common service provider. It should be understood that different SSIDs or other identifiers could be employed. Although WLAN 321 and WLAN 322 are present during this initial stage in FIG. 4, WLAN 322 might not be present initially and instead be provided by second smartphone 312 at a later time.

In response to detecting the SSID of at least first WLAN 321, client device 310 transfers a response to join WLAN 321 and transfers a media access control (MAC) address with the response. This example discusses where the user identifier is a media access control (MAC) address. Other identifiers could be employed in other examples, and could include another network address, such as an IP address, or could include a mobile device number (MDN), mobile station identifier (MSID), mobile equipment identifier (MEID), mobile identification number (MIN), electronic serial number (ESN), device type, model number, serial number, SIM card identifier, phone number, account number, or other identifier.

First smartphone 311 receives the MAC address for client device 310, and determines a local usage status for the MAC address of client device 310. To determine the local usage status, first smartphone 311 queries the MAC address in a first database in first smartphone 311 to determine if the MAC address for client device 310 has any usage credits remaining in the first database. In this example, first smartphone 311 determines that insufficient usage credits remain for client device 310 in the first database, or alternately that no entry for the MAC address of client device 310 is in the first database. In response to determining that insufficient usage credits remain for client device 310 in the first database, first smartphone 311 communicates with authorization server 340 to synchronize the first database with the usage status information for client device 310 included in master database 342. In this example, first smartphone 311 communicates over wireless link 325 with base station 332 of cellular data network 330, and over Internet 350 to communicate with authorization server 340. Communicating through base station 332 and over cellular data network 330 may include first smartphone 311 registering for wireless access through base station 332. To synchronize the first database with the usage status information for client device 310, first smartphone 311 transfers a usage request indicating the MAC address for client device 310.

Authorization server 340 receives the usage request transferred by first smartphone 311 and processes the usage request in master database 342 to determine if the MAC address of client device 310 has any remaining usage credits indicated by master database 342. In this example, authorization server 340 determines that insufficient usage credits remain for client device 310 in master database 342, or alternately that no entry for the MAC address of client device 310 is in master database 342. Responsively, authorization server 340 initiates a tunnel with client device 310 to allow client device 310 to register for usage credits, such as by purchasing usage credits. The tunnel is established between client device 310 and authorization server 340, over Internet 350, cellular data network 330, and WLAN 321. The tunnel could comprise an Internet protocol (IP) tunnel, Layer 2 Tunneling Protocol (L2TP), Internet Protocol Security (IPsec), a tunnel over a Point-to-Point (PPP) link, or other links or tunnels. Client device 310 then registers or purchases usage credits from authorization server 340 over the tunnel. Authorization server 340 could present a web interface to client device 310 over the tunnel for registering and purchasing usage credits, or could provide an application-based user interface for client device 310 to purchase the usage credits. The registration or purchase processes for obtaining usage credits could include providing user information, purchasing credits, providing payment information, selecting usage credit amounts, or selecting usage credit durations, among other operations.

In this example, first smartphone 311 allows access through WLAN 321 for client device 310 to allow authorization server 340 and client device 310 to establish the tunnel and proceed through the usage credit purchase or registration process. In some examples, only tunnel traffic is routed by first smartphone 311 between client device 310 and authorization server 340 during the usage credit purchase or registration process, and other traffic is not routed. In other examples, outgoing traffic transferred by client device 310 which is not associated with the tunnel or with establishing the tunnel is inhibited by first smartphone 311 until usage credits are established.

Once the usage credits have been registered with authorization server 340, such as by client device 310 purchasing usage credits over the tunnel, authorization server 340 transfers an update message for delivery to first smartphone 311. The update message indicates the usage credits for the MAC address associated with user device 310. First smartphone 311 updates the first database in first smartphone 311 and allows access for a first user data session for client device 310. The first user data session includes allowing Internet access, by routing data for client device 310 over wireless link 325, and thus over cellular data network 330 and Internet 350. During the Internet access process and associated first user data session, client device 310 could engage in various data transfers, web accesses, email exchanges, messaging, packet voice calls, video transfers, downloads, or other Internet communications. Also during the Internet access process of the first user data session, first smartphone 311 decrements the usage credits in the first database according to the duration of the first user data session. The decrementing occurs in increments, such as after every minute of access. Also, first smartphone 311 transfers periodic updates for delivery to authorization server 340. The periodic updates are based on the decremented usage credits for the MAC address associated with client device 310, and could include information of the time used, usage credits remaining, usage credits consumed, or other indications of the first user data session usage as well as an indicator of the MAC address. These periodic updates to authorization server 340 could occur upon each instance of decrementing the usage credits in the first database, or according to a different update period. Although in this example, short decrementing periods are discussed, such as a minute, while in other examples a longer period could be employed, or a connection instance-based counter employed. Authorization server 340 updates master database 342 based on the periodic updates transferred by second smartphone 312.

During the first user data session of client device 310, the first user data session is terminated. This termination could occur due to a powered down state of first smartphone 311 initiated by a user of first smartphone 311, or due to first smartphone 311 leaving the immediate vicinity of client device 310. Other examples include where a user of first smartphone 311 disables a wireless connection sharing application on first smartphone 311, disables WLAN 321, or when WLAN 321 becomes unavailable due to signal loss, among other occurrences. However, client device 310 and authorization server 340 do not receive any notification from first smartphone 311 of the termination of the first user data session, or of any power status, application status, or network status changes of first smartphone 311 or of WLAN 321.

Client device 310 eventually detects the loss of Internet access through first smartphone 311, such as from packet loss, unroutable communications, traffic error messages, packet timeout conditions, or by detecting the loss of a network connection through WLAN 321, among other loss detections. Client device 310 may try to re-initiate a network connection through WLAN 321 if WLAN 321 is still available, such as during temporary wireless signal degradation. However, assuming access through first smartphone 311 has become unavailable, client device 310 then detects the SSID transferred by second smartphone 312, and responsively transfers a response to join WLAN 322 and transfers the MAC address with the response. Second smartphone 312 receives the MAC address for client device 310, and determines a local usage status for the MAC address of client device 310. To determine the local usage status, second smartphone 312 queries the MAC address in a second database in second smartphone 312 to determine if the MAC address for client device 310 has any usage credits remaining in the second database. In this example, second smartphone 312 determines that insufficient usage credits remain for client device 310 in the second database, or alternately that no entry for the MAC address of client device 310 is in the second database. In response, second smartphone 312 communicates with authorization server 340 to synchronize the second database with the usage status information for client device 310 included in master database 342.

Second smartphone 312 communicates over wireless link 326 with base station 332 of cellular data network 330, and over Internet 350 to communicate with authorization server 340. Communicating through base station 332 and over cellular data network 330 may include second smartphone 312 registering for wireless access through base station 332. To synchronize the second database with the usage status information for client device 310, second smartphone 312 transfers a usage request indicating the MAC address for client device 310. Authorization server 340 receives the usage request transferred by second smartphone 312 and processes the usage request in master database 342 to determine if the MAC address of client device 310 has any remaining usage credits indicated by master database 342. In this example, since first smartphone 311 periodically updated the usage credit status with authorization server 340 during the first user data session through first smartphone 311, master database 342 has an indication of the usage credits remaining for user device 310.

Authorization server 340 transfers an update message for delivery to second smartphone 312 indicating the usage credits and the MAC address for user device 310. Second smartphone 312 updates the second database in second smartphone 312 according to the update message, and allows access for a second user data session for client device 310. The second user data session includes allowing Internet access, by routing data for client device 310 over wireless link 326, and thus over cellular data network 330 and Internet 350. As with the first user data session, during the second Internet access process of the associated second user data session, client device 310 could engage in various data transfers, web accesses, email exchanges, messaging, packet voice calls, video transfers, downloads, or other Internet communications. Also during the second Internet access process, second smartphone 312 decrements the usage credits in the second database according to the duration of the second user data session. The decrementing occurs in increments, such as after every minute of access. Also, second smartphone 312 transfers periodic updates for delivery to authorization server 340. The periodic updates are based on the decremented usage credits for the MAC address associated with client device 310, and could include information of the time used, usage credits remaining, usage credits consumed, or other indications of the second user data session usage as well as an indicator of the MAC address. These periodic updates to authorization server 340 could occur upon each instance of decrementing the usage credits in the second database, or according to a different update period. Authorization server 340 updates master database 342 based on the periodic updates transferred by second smartphone 312.

In further examples, to provide the wireless access, a user of first smartphone 311 or second smartphone 312 enter into a connection sharing mode on the associated smartphone. A user interface on the associated smartphone, such as an application, app, graphical user interface, or other user interface could be presented to the user to initiate the connection sharing mode. Once in the connection sharing mode, the associated smartphone would then provide the wireless signals, such as a WLAN, for use by user devices, such as client device 310, to receive communication services over a wireless link between the smartphone and a base station. For example, first smartphone 311 could receive an instruction from an operator or user of first smartphone 311 to provide the wireless communication service to other devices, and in response, first smartphone 311 transfers an activation message to authorization server 340 and transfers the wireless beacon signal, such as an SSID. Authorization server 340 could receive and process the activation message to generate and transfer an update message for the first database in first smartphone 311. The update message could be based on a master database associated with authorization server 340. First smartphone 311 then receives and processes the update message for the first database to update the first database in first smartphone 311.

In yet further examples, a control server, such as authorization server 340, tracks the decrementing of the usage credits on a per-smartphone basis. A service credit account could be established for the associated provider smartphone, and as user devices, such as client device 310, obtain wireless access through the associated provider smartphone, the service credit account could be increased in credits corresponding to the usage credits used by connected user devices. For example, authorization server 340 could credit an account for first smartphone 311 responsive to the first data structure updates or other periodic usage credit updates transferred to authorization server 340, and credit an account for second smartphone 312 responsive to the second data structure updates or other periodic usage credit updates transferred to authorization server 340.

Figure 5:
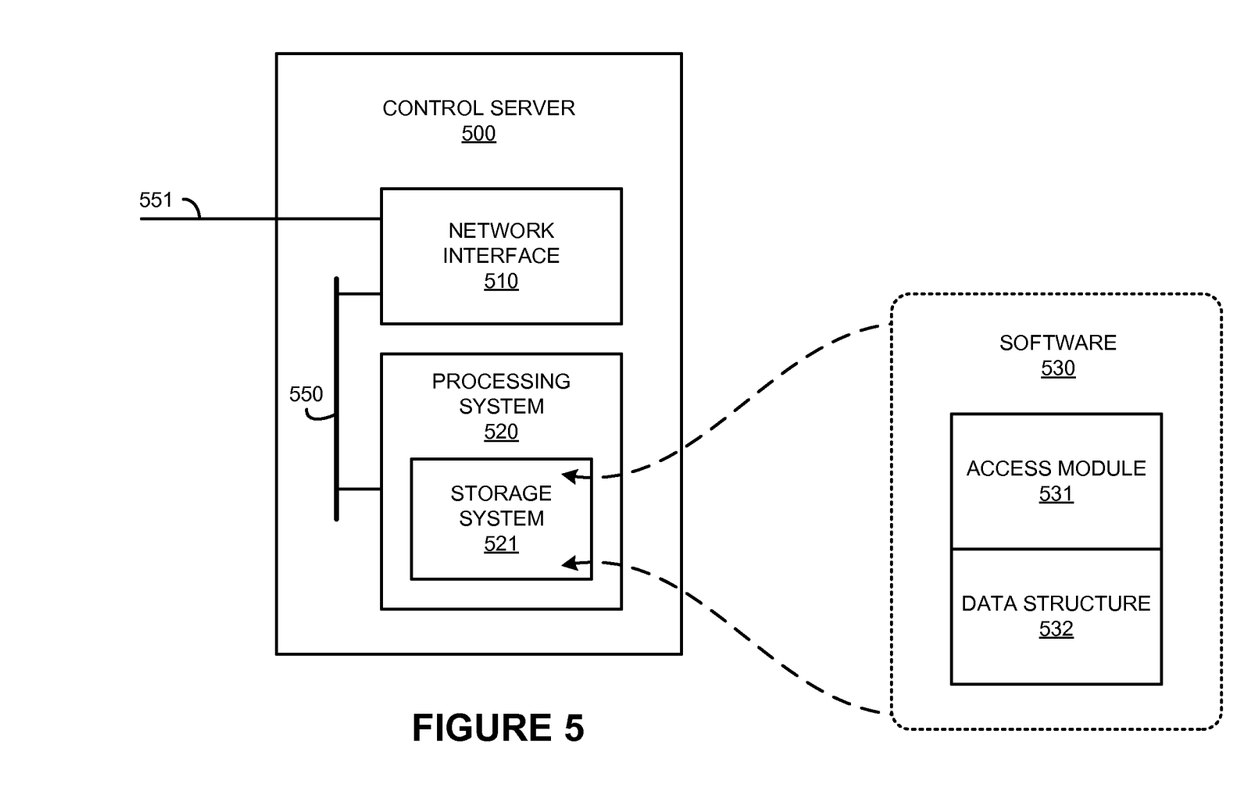
FIG. 5 is a block diagram illustrating a control server.

FIG. 5 is a block diagram illustrating control server 500, as an example of control server 130 found in FIG. 1, or authorization server 340 found in FIG. 3, although control server 130 or authorization server 340 could use other configurations. Control server 500 includes network interface 510 and processing system 520. Network interface 510 and processing system 520 are shown to communicate over a common bus 550 for illustrative purposes. It should be understood that discrete links could be employed, such as network links. Control server 500 may be distributed among multiple devices that together form elements 510, 520-521, 530-532, and 550-551.

Network interface 510 comprises network interface, router, and gateway equipment for communicating with wireless communication provider equipment, such as with wireless communication networks, over the Internet, or other communication systems. Network interface 510 exchanges communications over link 551. Link 551 could use various protocols or communication formats as described herein for links 155-156 or 327-328, including combinations, variations, or improvements thereof.

Processing system 520 includes storage system 521. Processing system 520 retrieves and executes software 530 from storage system 521. In some examples, processing system 520 is located within the same equipment in which network interface 510 is located. In further examples, processing system 520 comprises specialized circuitry, and software 530 or storage system 521 could be included in the specialized circuitry to operate processing system 520 as described herein. Storage system 521 could include a computer-readable medium such as a disk, tape, integrated circuit, server, or some other memory device, and also may be distributed among multiple memory devices.

Software 530 may include an operating system, logs, utilities, drivers, networking software, and other software typically loaded onto a computer system. Software 530 could contain application programs, server software, firmware, or some other form of computer-readable processing instructions. When executed by processing system 520, software 530 directs processing system 520 to operate as described herein, such as access data structures to determine usage credits for users, exchange information with wireless communication devices to update usage credit status information, and communicate with user devices to establish user credits, among other operations.

In this example, software 530 includes access module 531 and data structure 532. It should be understood that a different configuration could be employed, and individual modules of software 530 could be included in different equipment than control server 500. Access module 531 receives usage requests and processes the usage requests to determine if user identifiers have usage credits in data structure 532, receives usage credit updates, updates data structure 532 based on the usage credit updates, and coordinates purchase of usage credits with user devices. Data structure 532 stores usage credit status based on user identifiers in a computer-readable storage medium. Data structure 532 could comprise a database, server, spreadsheet, table, list, or other data structure.

Bus 550 comprises a physical, logical, or virtual communication link, capable of communicating data, control signals, and communications, along with other information. In some examples, bus 550 is encapsulated within the elements of network interface 510 or processing system 520, and may be a software or logical link. In other examples, bus 550 uses various communication media, such as air, space, metal, optical fiber, or some other signal propagation path, including combinations thereof. Bus 550 could be a direct link or might include various equipment, intermediate components, systems, and networks. Bus 550 could be a common link, shared link, or may be comprised of discrete, separate links.

Figure 6:
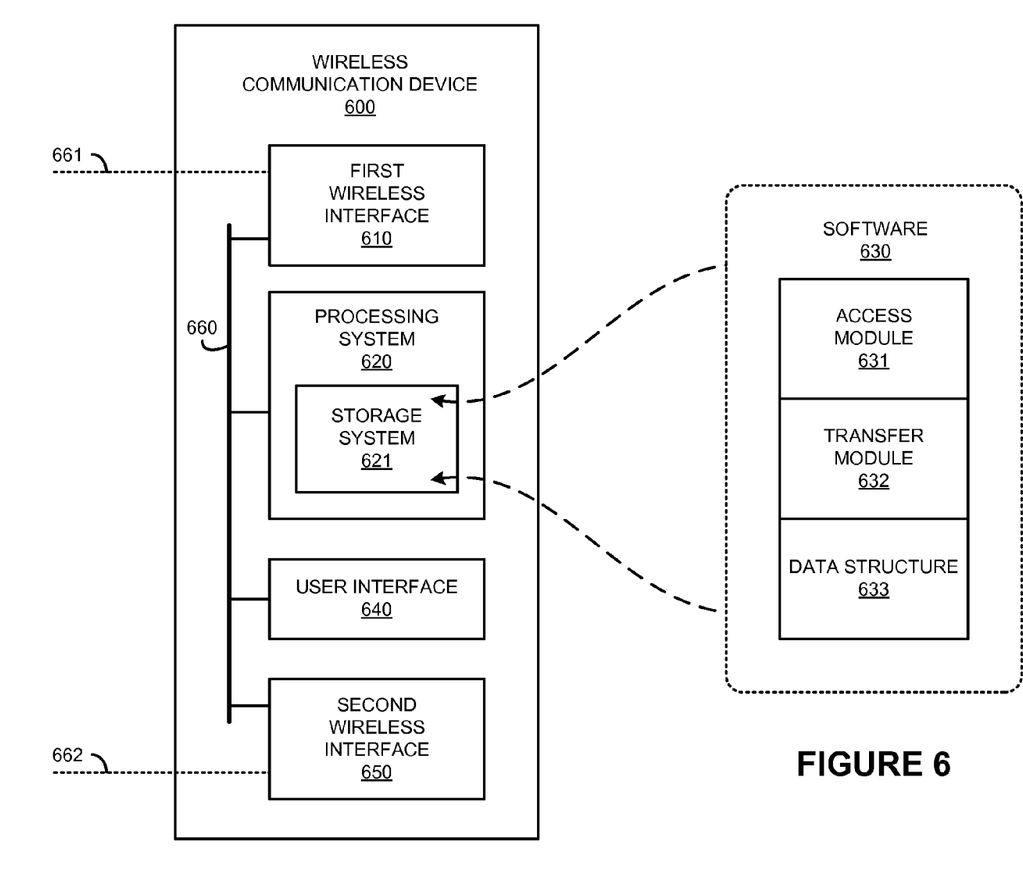
FIG. 6 is a block diagram illustrating a wireless communication device.

FIG. 6 is a block diagram illustrating wireless communication device 600, as an example of wireless communication devices 111-112 found in FIG. 1 or smartphones 311-312 found in FIG. 3, although wireless communication devices 111-112 or smartphones 311-312 could use other configurations. Wireless communication device 600 includes, first wireless interface 610, processing system 620, user interface 640, and second wireless interface 650. First wireless interface 610, processing system 620, user interface 640, and second wireless interface 650 communicate over bus 660. Wireless communication device 600 may be distributed or consolidated among equipment or circuitry that together forms the elements of wireless communication device 600.

First wireless interface 610 comprises a communication interface for communicating with wireless access nodes of a wireless communication network or a cellular data network. First wireless interface 610 could include transceiver equipment and antenna elements for wirelessly exchanging user communications and overhead communications over the associated wireless link 661. First wireless interface 610 also receives command and control information and instructions from processing system 620 or user interface 640 for controlling the operations of wireless communications over wireless link 661. Wireless link 661 could use various protocols or communication formats as described herein for wireless links 153-154 or 325-326, including combinations, variations, or improvements thereof.

Processing system 620 includes storage system 621. Processing system 620 retrieves and executes software 630 from storage system 621. In some examples, processing system 620 is located within the same equipment in which first wireless interface 610, user interface 640, or second wireless interface 650 are located. In further examples, processing system 620 comprises specialized circuitry, and software 630 or storage system 621 could be included in the specialized circuitry to operate processing system 620 as described herein. Storage system 621 could include a computer-readable medium such as a disk, tape, integrated circuit, server, or some other memory device, and also may be distributed among multiple memory devices.

Software 630 may include an operating system, logs, utilities, drivers, networking software, and other software typically loaded onto a computer system. Software 630 could contain application programs, server software, firmware, or some other form of computer-readable processing instructions. When executed by processing system 620, software 630 directs processing system 620 to operate as described herein, such as provide a wireless network for user devices, determine usage credit status in data structures, and determine updates for usage credit status in data structures, among other operations.

In this example, software 630 includes access module 631, transfer module 632, and data structure 633. It should be understood that a different configuration could be employed, and individual modules of software 630 could be included in different equipment in wireless communication device 600. Access module 631 determines if user devices have usage credits based on the usage credits stored in data structure 633, receives update messages for usage credits transferred by a control server, updates data structure 633 based on the update messages or periodically based on usage by a user device, and transfers update messages for delivery to a control server. Transfer module 632 receives communications over first wireless interface 610 and transfers the communications for delivery over second wireless interface 650. Transfer module 632 receives communications over second wireless interface 650 and transfers the communications for delivery over first wireless interface 610. Transfer module 632 and access module 631 communicate to determine when communications for user devices are allowed to be exchanged through wireless communication device 600. Data structure 633 stores usage credit status based on user identifiers in a computer-readable storage medium. Data structure 633 could comprise a database, spreadsheet, table, list, or other data structure.

User interface 640 includes equipment and circuitry for receiving user input and control, such as for engaging in voice calls, data sessions, or configuring wireless communication device 600 to enter into a provider mode, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 640 also includes equipment to communicate information to a user of wireless communication device 600. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Second wireless interface 650 comprises a communication interface for communicating with user devices over a wireless link. Second wireless interface 650 could include transceiver equipment and antenna elements for wirelessly exchanging user communications and overhead communications over the associated wireless link 662. Second wireless interface 650 also receives command and control information and instructions from processing system 620 or user interface 640 for controlling the operations of wireless communications over wireless link 662. Wireless link 662 could use various protocols or communication formats as described herein for wireless links 153-154 or 325-326, including combinations, variations, or improvements thereof.

Bus 660 comprises a physical, logical, or virtual communication link, capable of communicating data, control signals, and communications, along with other information. In some examples, bus 660 is encapsulated within the elements of first wireless interface 610, processing system 620, user interface 640, or second wireless interface 650, and may be a software or logical link. In other examples, bus 660 uses various communication media, such as air, space, metal, optical fiber, or some other signal propagation path, including combinations thereof. Bus 660 could be a direct link or might include various equipment, intermediate components, systems, and networks.

Referring back to FIG. 1, wireless communication devices 111-112 and user device 110 each comprise transceiver circuitry and communication elements. The transceiver circuitry typically includes amplifiers, filters, modulators, and signal processing circuitry. Wireless communication devices 111-112 and user device 110 may also each include user interface systems, memory devices, computer-readable storage mediums, software, processing circuitry, or some other communication components. Wireless communication devices 111-112 and user device 110 may each comprise a user device, subscriber equipment, customer equipment, access terminal, telephone, mobile wireless telephone, computer, laptop, pad computer, netbook, e-book, mobile Internet appliance, personal digital assistant (PDA), mobile hotspot, Wi-Fi router, smartphone, wireless network interface card, media player, game console, or some other wireless communication apparatus, including combinations thereof. Although two wireless communication devices and one user device are shown in FIG. 1, it should be understood that a different number of wireless communication devices or user devices could be shown.

Wireless communication network 120 comprises communication and control systems for providing wireless access to communication services for wireless communication devices. In some examples, wireless communication network 120 includes equipment to provide wireless access to communication services within different coverage areas to user devices, route communications between content providers and user devices, and receive registration and content requests, among other operations. Wireless communication network 120 may also comprise base stations, base transceiver stations (BTS), wireless access nodes, wireless access node controllers, base station controllers (BSC), mobile switching centers (MSC), radio node controllers (RNC), call processing systems, authentication, authorization and accounting (AAA) equipment, access service network gateways (ASN-GW), packet data switching nodes (PDSN), home agents (HA), home location registers (HLR), mobility access gateways (MAG), Internet access nodes, telephony service nodes, wireless data access points, routers, databases, or other communication and control equipment.

Control server 130 comprises communication interfaces, computer systems, microprocessors, circuitry, computer-readable media, or other processing devices or software systems, and may be distributed among multiple processing devices. Control server 130 could be included in the equipment or systems of wireless communication network 120, or could be included in separate equipment or systems. Examples of control server 130 may also include software such as an operating system, logs, utilities, drivers, databases, data structures, networking software, and other software stored on a computer-readable medium. Control server 130 could also include an authorization server, application server, application service provider system, database system, web server, or other systems.

Internet 140 includes equipment and systems to route packet communications between endpoints using the Internet protocol (IP). Internet 140 could comprise routers, switches, gateways, bridges, as well as various network links. Although Internet 140 is shown in FIG. 1, it should be understood that another network could be included, such as packet networks, local area networks, wide area networks, metropolitan area networks, among other networks and systems.

Wireless links 151-154 each use the air or space as the transport media. Wireless links 151-154 may each use various protocols, such as Code Division Multiple Access (CDMA), Evolution-Data Optimized (EV-DO), single-carrier radio transmission technology link (1xRTT), Worldwide Interoperability for Microwave Access (WiMAX), Global System for Mobile Communication (GSM), Universal Mobile Telecommunications System (UMTS), Long Term Evolution (LTE), Wireless Fidelity (Wi-Fi), High Speed Packet Access (HSPA), Radio Link Protocol (RLP), Bluetooth, or some other wireless communication format, including combinations, improvements, or variations thereof. Although four wireless links are shown in FIG. 1, it should be understood that wireless links 151-154 are merely illustrative to show communication modes or wireless access pathways for wireless communication devices 111-112 and user device 110. In other examples, further wireless links could be shown, with portions of the further wireless links shared and used for different communication sessions and associated user and overhead communications.

Communication links 155-156 each use metal, glass, optical, air, space, or some other material as the transport media.

Communication links 155-156 could each use various communication protocols, such as Time Division Multiplex (TDM), asynchronous transfer mode (ATM), Internet Protocol (IP), Ethernet, synchronous optical networking (SONET), circuit-switched, communication signaling, wireless communications, or some other communication format, including combinations, improvements, or variations thereof. Communication links 155-156 could each be a direct link or may include intermediate networks, systems, or devices, and could include a logical network link transported over multiple physical links.

Links 151-156 may each include many different signals sharing the same associated links, as represented by the associated lines in FIG. 1, comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device between a Wireless Fidelity (WiFi) link and a Long Term Evolution (LTE) link, the method comprising:
   the wireless communication device wirelessly transferring a WiFi beacon signal and wirelessly receiving an access request indicating a user identifier from a user computer;
   the wireless communication device determining when the user identifier has sufficient usage credit, then wirelessly exchanging WiFi signals including user communications with the user computer over the WiFi link and wirelessly exchanging LTE signals including the user communications with a wireless network over the LTE link;
   the wireless communication device decrementing the usage credit for the user identifier based on the exchange of the WiFi signals including the user communications and wirelessly transferring usage credit consumption over the LTE link for delivery to an authorization server;
   after decrementing the usage credit, the wireless communication device determining if the user identifier has the sufficient usage credit, and when the user identifier does not have the sufficient usage credit, then wirelessly transferring a credit request over the LTE link for delivery to the authorization server;
   the wireless communication device wirelessly receiving an additional usage credit for the user identifier from the authorization server over the LTE link and exchanging additional wireless WiFI signals including additional user communications with the user computer and exchanging additional wireless LTE signals including the additional user communications over the LTE link; and
   the wireless communication device decrementing the additional usage credit for the user identifier based on the exchange of the additional wireless WiFI signals including the additional user communications and wirelessly transferring additional usage credit consumption over the LTE link for delivery to the authorization server.

2. The method of claim 1 wherein the user identifier comprises a device identifier and the usage credit consumption and the additional usage credit consumption are for the device identifier.

3. The method of claim 1 wherein the user identifier comprises an account number, and the usage credit consumption and the additional usage credit consumption are for the account number.

4. The method of claim 1 wherein the user identifier comprises a device identifier and an account number and the usage credit consumption and the additional usage credit consumption are for the device identifier and the account number.

5. The method of claim 1 wherein the user identifier comprises a Mobile Equipment Identifier (MEID).

6. The method of claim 1 wherein the user identifier comprises a Mobile Device Number (MDN).

7. The method of claim 1 wherein the WiFi beacon signal indicates a Service Set Identifier (SSID).

8. The method of claim 1 wherein the access request comprises an Internet access request.

9. The method of claim 1 wherein a data network exchanges the user communications between the LTE link and an Internet.

10. The method of claim 1 wherein the wireless communication device comprises an LTE phone and a WiFi hotspot.

11. A wireless communication device to operate between a Wireless Fidelity (WiFi) link and a Long Term Evolution (LTE) link, the wireless communication device comprising:
   a WiFi communication interface configured to wirelessly transfer a WiFi beacon signal, wirelessly receive an access request indicating a user identifier from a user computer, wirelessly exchange WiFi signals including user communications with the user computer over the WiFi link, and wirelessly exchange additional WiFi signals including additional user communications with the user computer over the WiFi link;
   an LTE communication interface configured to wirelessly exchange LTE signals including the user communications with a wireless network over the LTE link, wirelessly transfer usage credit consumption over the LTE link for delivery to an authorization server, wirelessly transfer a credit request over the LTE link for delivery to the authorization server; wirelessly receive an additional usage credit for the user identifier from the authorization server over the LTE link, wirelessly exchange additional LTE signals including additional user communications with the wireless network over the LTE link, and wirelessly transfer additional usage credit consumption over the LTE link for delivery to the authorization server;
   a processing system configured to determine when the user identifier has sufficient usage credit, and then to direct the exchange of the WiFi signals including the user communications, decrement the usage credit for the user identifier based on the exchange of the WiFi signals including the user communications and direct the transfer of the usage credit consumption;
   after decrementing the usage credit, the processing system is configured to determine if the user identifier has the sufficient usage credit, and when the user identifier does not have the sufficient usage credit, then to direct the transfer of the credit request, direct the exchange of the additional WiFi signals including the additional user communications responsive to the additional usage credit, decrement the additional usage credit for the user identifier based on the exchange of the additional wireless WiFI signals including the additional user communications, and direct the transfer of the additional usage credit consumption.

12. The wireless communication device of claim 11 wherein the user identifier comprises a device identifier and the usage credit consumption and the additional usage credit consumption are for the device identifier.

13. The wireless communication device of claim 11 wherein the user identifier comprises an account number, and the usage credit consumption and the additional usage credit consumption are for the account number.

14. The wireless communication device of claim 11 wherein the user identifier comprises a device identifier and an account number and the usage credit consumption and the additional usage credit consumption are for the device identifier and the account number.

15. The wireless communication device of claim 11 wherein the user identifier comprises a Mobile Equipment Identifier (MEID).

16. The wireless communication device of claim 11 wherein the user identifier comprises a Mobile Device Number (MDN).

17. The wireless communication device of claim 11 wherein the WiFi beacon signal indicates a Service Set Identifier (SSID).

18. The wireless communication device of claim 11 wherein the access request comprises an Internet access request.

19. The wireless communication device of claim 11 wherein a data network exchanges the user communications between the LTE link and an Internet.

20. The wireless communication device of claim 11 wherein the wireless communication device comprises an LTE phone and a WiFi hotspot.

* * * * *